Figure 1:
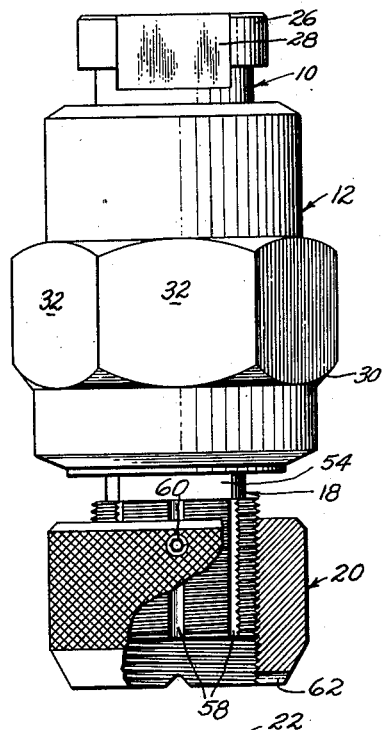

Feb. 18, 1958 W. NIPKEN 2,823,563
DEPTH CONTROL ATTACHMENT FOR A DRILL OR THE LIKE
Filed Sept. 6, 1956

INVENTOR
WALTER NIPKEN
BY Teller & McCormick
ATTORNEYS

United States Patent Office 2,823,563
Patented Feb. 18, 1958

2,823,563

DEPTH CONTROL ATTACHMENT FOR A DRILL OR THE LIKE

Walter Nipken, Irvington, N. J.

Application September 6, 1956, Serial No. 608,276

4 Claims. (Cl. 77—55)

This invention relates to an improved attachment for a drill or for other boring tools and, more specifically, to an improved depth control attachment for a tool of the aforesaid type.

This application constitutes a continuation-in-part of application Serial No. 373,611, filed August 11, 1953, now abandoned.

It is the general object of the invention to provide a device which can easily be detachably secured in selected position along a drill or other boring tool to provide a depth gage therefor, the device including a stop member which is adjustable for precise depth control and which is arranged to engage the surface of a workpiece so as to avoid damage thereto.

Other objects of the invention as well as features of construction will become apparent to those skilled in the art from the following specification having reference to the attached drawing. A presently preferred embodiment of the invention is shown in the drawing and the specification includes a detailed description thereof. However, the drawing and description of the preferred embodiment should not be taken as defining the scope of the invention, the claims forming a part of the specification being relied upon for that purpose.

Figure 2:
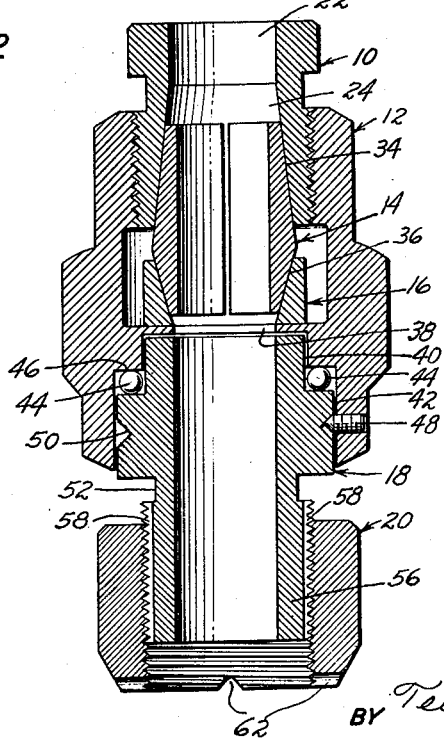

Of the drawing,

Fig. 1 is an elevational view of the depth control attachment with the adjustable stop member shown partly in section to illustrate a detail; and Fig. 2 is a vertical cross-sectional view of the said depth control attachment.

With only general reference to the drawing the preferred form of depth control attachment or drill stop may be described as comprising a chuck 10 which is threaded into one end of a housing 12 to engage and selectively open and close a collet 14 which rests upon a seat 16 within the housing. The drill or other boring tool is extended through the chuck, the collet and the housing and the device is secured to the drill by closing the collet around the tool. When the device is secured to the tool, the chuck, the housing, the collet and the collet seat all rotate therewith if the tool rotates or they are held with the tool when a workpiece is rotated relative thereto. For convenience in description, it is to be assumed that the tool is rotated relative to a workpiece and that the tool is held in a vertical position whereby the stop device is supported with the chuck 10 at the top end of the housing 12 and with the cutting end of the tool projecting from the bottom end of the housing. A stop sleeve 18 is supported in the bottom end of the housing 12 and projects downwardly therefrom, the said sleeve surrounding the drill or other boring tool in spaced relationship. As will be described hereinafter, the stop sleeve is so supported within the housing that it can be rotated relative to the other elements of the attachment or held against rotation while the said other elements are rotated. The depending or projecting portion of the stop sleeve 18 is threaded to receive an adjustable stop nut 20 which will engage a surface of the workpiece when the cutting end of the tool reaches the desired or selected depth within the workpiece.

With more specific reference to the drawing for a detailed description of the elements of the depth gage or depth control attachment, attention is invited to the chuck 10. The said chuck is generally cylindrical and has external threads on its lower portion for engagement within the upper end of the bore in the housing 12. The chuck is also provided with a vertically extending bore comprising an upper cylindrical portion 22 and a lower tapered portion 24 which diverges downwardly. A head 26 is provided on the chuck 10 and flat wrench-receiving areas 28 are defined on the said head so that the chuck can conveniently be gripped and rotated relative to the housing 12 to effect the necessary threaded engagement and disengagement.

The said housing has an external boss 30 provided with wrench-receiving faces 32, 32 so that it can be held while the chuck is turned. When the chuck is threaded into the housing, it engages and compresses or closes the collet 14. The collet 14 is split along its length so that it can be closed and opened to vary the effective diameter of its central tool-receiving bore. The collet is closed and opened responsive to movement of the chuck relative to the housing by providing an external upper taper 34 on the collet which is complementary to the taper in the lower portion 24 of the chuck bore. The bottom portion of the collet is tapered as indicated at 36, this taper converging downwardly and being complementary to the taper in the annular collet seat 16. Thus, when the chuck 10 is threaded into the vertical bore of the housing 12, the tapered portions 34 and 36 of the collet are engaged by the chuck and by the seat 16 to close the collet upon a boring tool extended therethrough. When the chuck 10 is withdrawn from the housing 12, the chuck and seat pressure are removed from the collet whereby the collet is permitted to expand. A preferred embodiment of the collet 14 has a relatively wide range of movement so that it can accommodate boring tools of different diameters within a substantial range. It is important to observe that the collet is substantially self-centering because the seat 16 is free to move on a shoulder 38 in the housing bore.

Immediately below the internal shoulder 38 in the housing 12 which supports the collet seat 16, the housing bore receives the stop sleeve 18. More specifically, the housing bore immediately below the shoulder 38 is sufficiently large to receive the upper end 40 of the stop sleeve in relatively closely spaced relationship providing free running or operating clearance for the sleeve. An enlarged bore portion is provided to receive an annular flange 42 on the sleeve and to accommodate a plurality of ball bearings 44, 44 between the flange 42 and a shoulder 46 in the bore. The enlarged portion of the housing bore is also sufficiently large to provide running or operating clearance for the flange 42 on the sleeve.

As shown in Fig. 2, the stop sleeve 18 is supported in the housing 12 on a plurality of pointed end set screws 48, 48 which extend through the wall of the housing into its bore and engage the sleeve in an annular V-groove 50 in the periphery of the flange 42. When the set screws are advanced into the oversized groove 50, they thrust the stop sleeve upwardly by a camming action whereby to thrust the ball bearings 44, 44 against the annular shoulder 46 in the housing 12. Thus, in rotation of the housing and other elements relative to the stop sleeve, the friction is taken on the ball bearings and on the pointed end set screws which ride within the annular V-groove. The bore of the sleeve is sufficiently large to provide operating clearance around any boring tool engaged by the collet.

It will be observed that the flange 42 on the stop sleeve 18 projects slightly below the bottom end of the housing 12 when the elements of the device are properly assembled as shown in Fig. 2. It will also be observed that the stop sleeve 18 has a reduced diameter portion 52 below the flange 42 and that external flat faces 54 are provided in the said reduced diameter portion. The flat faces are provided to receive a wrench so as to retain the stop sleeve from rotation while the stop nut 20 is threaded on the bottom end portion 56 of the said sleeve to project downwardly therefrom for engagement with a workpiece. The said threaded end portion of the stop sleeve has a plurality of substantially vertically extending grooves 58, 58 which are located in equally circumaxially spaced relationship around the sleeve. The grooves 58, 58 are provided to receive the inner end of a set screw 60 extending from the stop nut 20. When the set screw 60 is advanced into any one of the vertical grooves 58, 58, the stop nut 20 is held against inadvertent or undesirable rotation relative to the sleeve 18.

It is an important feature of the present invention to provide the aforesaid vertical grooves on the sleeve and the set screw on the nut. That is, when the set screw 60 is retracted from one of the grooves 58 and the nut 20 rotated relative to the stop sleeve to a position wherein the set screw will engage another of the grooves 58, the stop nut will be moved vertically a known distance. In a preferred form, the threads on the sleeve 18 and on the nut 20 are relatively fine and eight vertically extending grooves 58, 58 are provided in equal circumaxially spaced relationship around the stop sleeve. In the said preferred arrangement with threads of desired size, the stop nut 20 will be moved vertically relative to the stop sleeve .003 inch when the set screw 60 is disengaged from one vertical groove 58 and the nut turned to engage the said set screw with the next adjacent vertical groove. This, of course, provides for vertical adjustment of the stop nut in known increments, each increment being .003 inch in the example given. In most operations where drilling depths are to be gaged, a tolerance of at least .003 inch is provided or permitted. Accordingly, in use of the depth gage of this invention, vertical adjustment of the stop nut can be accomplished easily in increments within the usual tolerances provided.

When the depth control attachment shown is to be used upon a boring tool such as a drill which is held in the chuck of a machine tool, the attachment is thrust upwardly on the drill from the lower end thereof until the said lower end of the drill projects from the bottom of the stop nut a distance approximately equal to the depth to be gaged. Then, the housing 12 is held while the chuck 10 is rotated to advance the chuck into the housing. Obviously, the chuck can be held against rotation while the housing is rotated relative thereto if it is more convenient to hold the chuck than to turn it. In such relative rotation of the chuck and housing, the collet 14 is closed upon the drill or other boring tool in its final position. Then, the downwardly projecting length of the drill between its tip and the bottom surface of the stop nut 20 is measured. If this length is not within the permitted tolerance in gaging the depth of the hole to be bored in a workpiece, the set screw 60 on the stop nut 20 is loosened and the stop nut is then rotated relative to the sleeve 18 to adjust its vertical location and bring the projecting length of the cutting tool within the permitted range. Then, the set screw 60 is again tightened to hold the stop nut 20 firmly in position on the stop sleeve 18.

With the depth gage thus properly located on the tool, the said tool can be advanced into the workpiece to bore the hole of desired depth. When the desired depth is reached, the bottom surface of the stop nut will engage the top surface of the workpiece. Such frictional engagement causes the stop nut and the sleeve to cease rotation while the chuck, the collet and the housing will continue to rotate with the tool. Thus, continued rotation of the boring tool after the desired depth has been reached will not increase the depth and will not cause movement of the stop sleeve on the surface of the workpiece, thereby avoiding damage to the said surface. Also, during rotation of the boring tool while the stop sleeve is in engagement with a workpiece, workpiece chips removed by the boring tool are discharged through a plurality of radially extending grooves 62, 62 on the bottom surface of the stop nut 20.

It will be understood that the foregoing description of a preferred embodiment of the invention should not be taken as defining or limiting the scope of the invention. There are apparently many changes which can be effected in the construction of a depth control attachment or stop within the scope of the invention as defined by the claims which follow.

The invention claimed is:

1. A depth control attachment for a drill or the like comprising in combination, a housing having a central bore, a chuck having a central bore and threaded into one end of the housing bore, a collet supported in the housing bore for engagement by the chuck and adapted to be closed by the chuck as it is advanced into the housing, a stop sleeve rotatably supported in the housing bore and projecting from the other end thereof, the projecting portion of said stop sleeve being provided with external threads, and a stop nut threaded on the projecting portion of said sleeve and extending therefrom, the attachment including all of the aforesaid components being adapted to receive a boring tool extending through the chuck and through the stop sleeve and the attachment being adapted for connection with the tool by closing the collet thereon at a selected location along the length of the tool, and the attachment being further adapted to adjust the extending length of the tool by adjustment of the stop nut on the stop sleeve.

2. A depth control attachment for a drill or the like comprising in combination, a housing having a substantially vertical bore, a chuck having a central bore and threaded into the upper end of the housing bore, a collet seated in the housing bore for engagement by a chuck and adapted to be closed by the chuck as it is advanced into the housing, a stop sleeve rotatably supported in the housing bore and projecting downwardly therefrom, the projecting portion of said stop sleeve being provided with external threads and a plurality of equally circumaxially spaced substantially vertical grooves extending through the threads, and a stop nut threaded on the projecting portion of said sleeve and having means selectively engageable in the said grooves, the attachment including all of the aforesaid components being adapted to receive a boring tool extending through the chuck and through the stop sleeve and the attachment being adapted for connection with the tool by closing the collet thereon at a selected location along the length of the tool, and the attachment being further adapted to adjust the extending length of the tool in known increments by adjustment of the stop nut on the stop sleeve and by selectively engaging the aforesaid means in the said grooves.

3. A depth control attachment for a drill or the like comprising in combination, a housing having a substantially vertical bore, a chuck having a central bore and threaded into the upper end of the housing bore, an annular collet seat movably supported in the housing bore, a collet disposed in the housing in engagement with the seat and adapted to be engaged and closed by the chuck as it is advanced into the housing, a stop sleeve rotatably supported in the housing bore and projecting downwardly therefrom, the projecting portion of the said stop sleeve being provided with external threads and a stop nut threaded on the projecting portion of said sleeve and extending downwardly therefrom, the attachment including all of the aforesaid components being adapted to receive a boring tool extending through the chuck and through the stop sleeve and the attachment being adapted for connection with the tool by closing the collet thereon at a selected location along the length of the tool, and the attachment being further adapted to adjust the downwardly projecting length of the tool by adjustment of the stop nut on the stop sleeve.

4. A depth control attachment for a drill or the like comprising in combination, a housing having a substantially vertical bore, a chuck having a central bore and threaded into the upper end of the housing bore, an annular collet seat movably supported in the housing bore, a collet disposed in the housing in engagement with the seat and adapted to be engaged and closed by the chuck as it is advanced into the housing, a stop sleeve rotatably supported in the housing bore and projecting downwardly therefrom, the projecting portion of said stop sleeve being provided with external threads and a plurality of equally circumaxially spaced substantially vertical grooves extending through the threads, and a stop nut threaded on the projecting portion of the said sleeve and extending downwardly therefrom, the said stop nut having means selectively engageable in the said grooves in rotated positions of the stop nut, the attachment including all of the aforesaid components being adapted to receive a boring tool extending through the chuck and through the stop sleeve and the attachment being adapted for connection with the tool by closing the collet thereon at a selected location along the length of the tool, and the attachment being further adapted to adjust the downwardly projecting length of the tool in known increments by adjustment of the stop nut on the stop sleeve and by selectively engaging the aforesaid means in the said grooves.

References Cited in the file of this patent

UNITED STATES PATENTS

| | | |
|---|---|---|
| 2,514,241 | Howland | July 4, 1950 |

FOREIGN PATENTS

| | | |
|---|---|---|
| 484,717 | Great Britain | May 10, 1938 |
| 558,733 | Great Britain | Jan. 18, 1944 |
| 560,507 | Great Britain | Apr. 6, 1944 |
| 875,441 | France | June 22, 1942 |